United States Patent
Rettig et al.

(10) Patent No.: US 11,635,117 B2
(45) Date of Patent: Apr. 25, 2023

(54) PROCESS FOR PRODUCING A PROTECTIVE COATING ON A BRAKE SIDE OF A BRAKE DISK MAIN ELEMENT AND PROCESS FOR PRODUCING A BRAKE DISK

(71) Applicant: Ford Global Technologies, LLC, Dearborn, MI (US)

(72) Inventors: Marc Oliver Rettig, Cologne (DE); Klaus Kaesgen, Cologne (DE); Clemens Maria Verpoort, Monheim am Rhein (DE); Jaroslaw Grochowicz, Essen (DE); Andreas Wank, Luckenbach (DE); Christian Schmengler, Luckenbach (DE); Annika Krause, Koblenz (DE)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 17/204,391

(22) Filed: Mar. 17, 2021

(65) Prior Publication Data
US 2021/0293292 A1    Sep. 23, 2021

(30) Foreign Application Priority Data
Mar. 17, 2020    (DE) .......................... 102020203412.5

(51) Int. Cl.
*F16D 65/12*    (2006.01)
*B23K 26/342*    (2014.01)

(52) U.S. Cl.
CPC .......... *F16D 65/127* (2013.01); *B23K 26/342* (2015.10); *F16D 65/125* (2013.01); *F16D 2200/003* (2013.01); *F16D 2200/0013* (2013.01); *F16D 2250/0046* (2013.01)

(58) Field of Classification Search
CPC ......... C23C 28/027; F16D 65/123–128; F16D 2200/0013; F16D 2200/003; F16D 2250/0046; B23K 26/342
USPC .............................. 188/18 A, 218 XL, 251 M
See application file for complete search history.

(56) References Cited

U.S. PATENT DOCUMENTS

| 8,034,153 B2 * | 10/2011 | Marchiando | ............ | B22F 5/009 419/13 |
| 2020/0072307 A1 * | 3/2020 | Rettig | ................... | C23C 28/027 |
| 2020/0378459 A1 * | 12/2020 | Carminati | ................. | C23C 4/10 |

FOREIGN PATENT DOCUMENTS

| DE | 102018212908 | 2/2020 |
| DE | 102019210088 | 3/2020 |
| DE | 102019212844 | 3/2020 |

* cited by examiner

*Primary Examiner* — Christopher P Schwartz
(74) *Attorney, Agent, or Firm* — Burris Law, PLLC

(57) ABSTRACT

A process for producing a protective coating on a brake side of a brake disk main element includes using a laser powder build-up welding process. An NbC metal matrix powder or a $Cr_3C_2$ metal matrix powder is produced by agglomeration and sintering of NbC particles or $Cr_3C_2$ particles with particles of a metallic matrix composed of a stainless steel. During the laser powder build-up welding process, the NbC metal matrix powder or the $Cr_3C_2$ metal matrix powder and an aluminum alloy powder is supplied simultaneously to a molten surface region of the brake disk main element which has been melted by a laser.

20 Claims, 1 Drawing Sheet

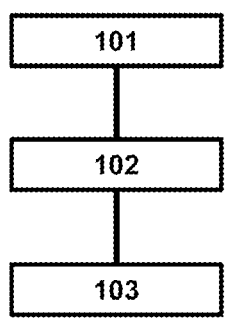
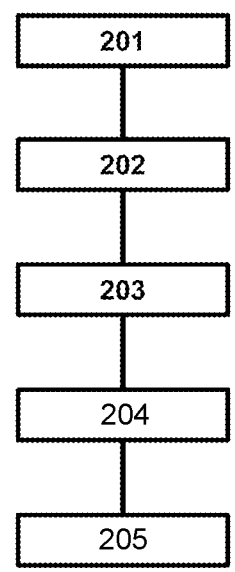
Fig. 1                    Fig. 2

PROCESS FOR PRODUCING A PROTECTIVE COATING ON A BRAKE SIDE OF A BRAKE DISK MAIN ELEMENT AND PROCESS FOR PRODUCING A BRAKE DISK

CROSS-REFERENCE TO RELATED APPLICATIONS

This application claims priority to and the benefit of DE 1020202034125, filed on Mar. 17, 2020. The disclosure of the above application is incorporated herein by reference.

FIELD

The present disclosure relates to a process for producing a protective coating on a brake side of a brake disk main element and a process for producing a brake disk.

BACKGROUND

The statements in this section merely provide background information related to the present disclosure and may not constitute prior art.

In a motor vehicle having an electric drive or a hybrid electric drive, the braking energy arising during a braking operation is utilized by what is termed regenerative braking in order to recharge a traction battery by an electric motor which is operated as a generator during the braking operation. Friction brakes of a motor vehicle having an electric drive or a hybrid electric drive are therefore usually utilized only for emergency stop situations.

The brake disks of the friction brakes of a motor vehicle having an electric drive or a hybrid electric drive could achieve a life of more than 10 to 15 years by reducing their use. However, the life of the brake disks is limited by the poor corrosion resistance of the brake disks made of gray cast iron which are conventionally used. Such brake disks display incipient rust in the region of the friction ring area of the brake disks after only a few hours in wet weather. Salt water produced from deicing salt, which can get onto a brake disk made of gray cast iron in winter, also reduces the life of such a brake disk.

However, this incipient rust would be removed again from the brake disks during a subsequent braking operation as a result of abrasive action of the conventional brake linings, so that no technical problems would result from the poor corrosion resistance of the gray cast iron used. However, owing to the relatively rare use of the brake disks of a motor vehicle having an electric drive or a hybrid electric drive, this cleaning of the brake disks usually occurs relatively rarely. If the brake disks are not cleaned of the corrosion which builds up in this way by possible emergency stop braking for a relatively long period of time, severe brake vibration and/or noise problems during braking would occur during a braking operation carried out by the friction brakes.

SUMMARY

This section provides a general summary of the disclosure and is not a comprehensive disclosure of its full scope or all of its features.

According to the present disclosure, an NbC metal matrix powder or a $Cr_3C_2$ metal matrix powder is firstly produced by agglomeration and sintering of NbC particles or $Cr_3C_2$ particles and particles of a metallic matrix composed of a stainless steel. The particles of the metallic matrix composed of a stainless steel can be FeCr particles, however the present disclosure is not limited thereto. The NbC particles (niobium carbide particles) or $Cr_3C_2$ particles (chromium carbide particles) can, before being combined with the particles of a stainless steel, i.e., for example, FeCr particles, and the subsequent agglomeration and sintering, have a particle size of on average about 1 µm (NbC) or about 1-5 µm ($Cr_3C_2$). Particles having such a small size cannot be conveyed or processed by conventional laser powder build-up welding apparatuses. As a result of the agglomeration and sintering of the NbC particles or $Cr_3C_2$ particles in each case together with the particles composed of a stainless steel, the composite particles of the NbC metal matrix powder or $Cr_3C_2$ metal matrix powder have a size which is significantly greater than that of the NbC particles or $Cr_3C_2$ particles, so that the particles of the NbC metal matrix powder or $Cr_3C_2$ metal matrix powder can be conveyed and processed by conventional laser powder build-up welding apparatuses, in particular the powder conveyors thereof. Using FeCr particles, it is possible to produce, for example, an NbC—FeCr powder as NbC metal matrix powder or, for example, a $Cr_3C_2$—FeCr powder as $Cr_3C_2$ metal matrix powder. In the following, the NbC metal matrix powder will also be referred to as NbC—FeCr powder and the $Cr_3C_2$ metal matrix powder will also be referred to as $Cr_3C_2$—FeCr powder, however the present disclosure is not limited thereto.

The particles of the NbC metal matrix powder or $Cr_3C_2$ metal matrix powder dissolve in the melt bath formed at the surface of the brake disk main element and bring about precipitation of carbide particles having a diameter of up to 100 µm, so that the carbide particles have an ideal size for abrasive wear protection. Such a brake disk which has been coated according to the present disclosure is also particularly suitable for use in a front wheel friction brake of a motor vehicle. The molten material of the brake disk main element can be utilized in a targeted manner in conjunction with further powder additive materials supplied to form a metallic matrix having improved properties. It can be advantageous to supply silicon, either via an Al Si-based alloy powder or via a mechanical powder mixture, in addition to aluminum as main constituent of the metallic matrix because silicon has a positive effect on breaking up $Al_2O_3$ passivating layers on the surface of the brake disk main element to be coated. In addition, additions of the elements copper, iron, chromium and/or nickel strengthen the metallic matrix as a result of formation of precipitates of intermetallic phases with aluminum, so that the wear resistance can be improved. In order to provide a fine distribution of the precipitates and thus inhibit embrittlement of the metallic matrix, the total content of the elements copper, iron, chromium and/or nickel may be limited to not more than 15% by weight in the protective coating.

The protective coating reinforced with niobium carbides or chromium carbides can have proportions of carbide of from 20% by volume to 70% by volume. The metallic matrix of the aluminum alloy powder is based on aluminum and may contain precipitates of silicon and intermetallic phases of aluminum with the elements copper, chromium, iron and/or nickel, which contribute to strengthening of the metallic matrix and thus to increased wear resistance. The process of the present disclosure thus makes it possible to produce an inexpensive protective coating which provides good corrosion and wear resistance for the friction surfaces of brake disks, in particular brake disks having a main element composed of an aluminum alloy.

The laser powder build-up welding process can be carried out so as to produce layers having a low degree of corrugation and small layer thickness fluctuations at high surface speeds, for example >10 m/min, with a high degree of overlap, for example >75%. In one form of the present disclosure, the high surface speed may be >60 m/min and the high degree of overlap may be >90%. In this way, it is possible to produce, for example, layers having an average thickness of only from 100 μm to 300 μm with roughnesses Ra of <10 μm and microhardnesses of on average 550-700 HV0.3. The individual powders can be supplied to the molten surface region of the brake disk main element via separate feed nozzles. In contrast to a sprayed-on tungsten carbide-based high speed flame spray coating, a metallurgical bond between the protective coating and the brake disk main element can be produced by the process of the present disclosure, so that possible migration of corrosive media underneath the protective coating is inhibited.

In one form, the proportion of silicon in the aluminum alloy powder used for forming the metallic matrix of the protective coating is more than 12% by weight and not more than 50% by weight. The silicon has, in particular, a positive effect on breaking up Al2O3 passivating layers on the surface of the brake disk main element to be coated.

In another form, the elements copper, iron, chromium and/or nickel are introduced into the melt bath in order to achieve an increase in the strength of the metallic matrix of the protective coating by formation of intermetallic phases. In order to provide fine distribution of the precipitates and thus inhibit embrittlement of the metallic matrix, the total content of the elements copper, iron, chromium and/or nickel may be limited to not more than 15% by weight in the protective coating.

Yet another form of the present disclosure provides for the NbC metal matrix powder or $Cr_3C_2$ metal matrix powder to be produced in such a way that a size of particles of the NbC metal matrix powder or $Cr_3C_2$ metal matrix powder is in the range from 10 μm to 125 μm, or in the range from 15 μm to 45 μm. This enables the NbC metal matrix powder, for example the NbC—FeCr powder, or the $Cr_3C_2$ metal matrix powder, e.g. the $Cr_3C_2$—FeCr powder, to be conveyed and processed by a conventional laser powder build-up welding apparatus, in particular the powder conveyor thereof.

According to another form, the proportion of NbC in the NbC metal matrix powder or the proportion of $Cr_3C_2$ in the $Cr_3C_2$ metal matrix powder is in the range from 50% by weight to 90% by weight, or from 75% by weight to 85% by weight for NbC and from 70% by weight to 80% by weight for $Cr_3C_2$. In this way, the protective coating produced by the process of the present disclosure has improved hardness and wear resistance.

In another form, the brake disk main element is heated, for example inductively or by use of flame burners or using a laser, in order to obtain a desired residual stress state in the protective coatings before and/or during the laser powder build-up welding. In this way, it is possible to realize, in particular, high carbide contents of about 60% by volume and average layer hardnesses of 700 HV0.3 without crack formation.

For the coating of brake disk main elements produced by casting, mention may be made of, as a further form, remelting of the surface of the brake disk main element, for example using the same laser which is also used for the laser powder build-up welding. Components composed of aluminum alloys and produced by pressure casting, in particular, have high contents of forcibly dissolved gases. If these components are incipiently melted at the surface for the purpose of build-up welding, the forcibly dissolved gases can be liberated and lead to severe pore formation. If the melt is maintained locally in a preceding remelting process for long enough to make degassing possible, the pore formation is effectively countered. At the same time, preheating of the brake disk main element occurs, which positively influences the residual stress state of the protective coatings.

In a further form, the laser powder build-up welding is carried out using a multijet powder nozzle having at least four jets. In another form, the multijet powder nozzle has six jets. Multijet nozzles make it possible, in contrast to angular gap nozzles, to inject individual components of the additional material mixture in a targeted manner at particular places in the melt bath produced at the component surface. In addition, the homogeneity of alloy formation and the location of the precipitation of the carbidic reinforcing phases can be influenced in a targeted manner.

The protective coating according to the present disclosure is usefully applied to the brake side or to the brake sides. In one form, the protective coating may be applied to the friction ring or to the friction rings of the brake disk. It is also possible to apply the protective coating to the entire brake disk, in particular on the outside.

Another form of the present disclosure provides for an aluminum alloy spray layer to be applied to the brake side of a brake disk main element composed of gray cast iron before carrying out the laser powder build-up welding operation, with the spray layer subsequently being sintered together with the brake disk main element. This form produces an improved bond between the brake disk main element and the protective layer according to the present disclosure which is subsequently applied to the spray layer. This is because it is technically not possible to apply an Al-based laser coating to a Fe-based material such as the gray cast iron. The spray layer and the brake disk main element can be, for example, sintered at about 570° C. for about 30 minutes in order to produce an improved bond between the brake disk main element and the spray layer. The aluminum alloy spray layer can, for example, be applied to the brake side of the brake disk main element by electric arc spraying, but alternatively also by wire flame spraying, powder flame spraying, high-speed flame spraying, cold gas spraying or plasma spraying. The protective layer according to the present disclosure can then be applied on top of this spray layer. In one form of the present disclosure, the aluminum alloy spray layer can be an Al—Mg spray layer.

The above is additionally achieved by a process in which a protective coating is produced on a brake side of the brake disk main element using the process according to any of the above-mentioned forms or a combination of at least two of these forms with one another.

This process is accordingly associated with the advantages indicated above in respect of the process. The brake disk which can be produced by the process has a relatively light weight because the brake disk main element is made of aluminum or an aluminum alloy, which has a positive effect on the energy consumption of a motor vehicle equipped therewith and is associated with greater corrosion resistance of the brake disk.

The above is also achieved by a process in which an aluminum alloy spray layer is applied to a brake side of the brake disk main element, the spray layer is sintered together with the brake disk main element and a protective coating is produced on a brake side of the spray layer using the process according to one of the above-mentioned forms or a combination of at least two of these forms with one another. The aluminum alloy spray layer can be an Al—Mg spray layer.

The advantages mentioned above in respect of the process are correspondingly associated with this process. The brake disk main element is cast from a gray cast iron material. The spray layer can be applied, for example, in a layer thickness in the range from 30 µm to 300 µm. The spray layer can, for example, be applied by electric arc spraying to the brake side of the brake disk main element. Sintering can be carried out at, for example, about 570° C. and for about 30 minutes. Diffusion of aluminum of the spray layer material into the surface of the brake disk main element is promoted thereby, as a result of which the adhesion of the spray layer to the brake disk main element is improved by formation of intermetallic iron aluminide phases. After production of the brake disk, at least one brake side or both brake sides of the brake disk can be ground in order to grind the brake disk to a nominal thickness and achieve desired roughness values of the brake side. Grinding can, for example, be carried out by diamond grinding. The protective layer is metallurgically bonded to the spray layer, which gives improved adhesion of the protective coating.

In one form, the brake side of the brake disk main element is roughened before application of the spray layer. The roughening of the brake side of the brake disk main element can, for example, be effected by water blasting, so that no heat is introduced into the brake disk main element during roughening. The roughening of the brake side of the brake disk main element can result in formation of cavitation undercuts on the brake side, which makes strong bonding between the brake disk main element and the spray layer possible as a result of parts of the spray layer projecting into the cavitation undercuts. In addition, the brake side can be cleaned by the water blasting.

Another form of the present disclosure provides for the brake disk main element to be subjected to a turning process before roughening. At least one smooth brake side or annular brake surface can be formed on the brake disk main element by this machining of the brake disk main element.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 shows a flow diagram for a working example of a process according to one form of the present disclosure for producing a brake disk; and FIG. 2 shows a flow diagram for a further working example of a process according to another form of the present disclosure for producing a brake disk.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a flow diagram for a working example of a process according to one form of the present disclosure for producing a brake disk.

In process step 101, an NbC metal matrix powder or a $Cr_3C_2$ metal matrix powder is produced by agglomeration and sintering of NbC particles or $Cr_3C_2$ particles and particles of a metallic matrix composed of a stainless steel. In one form of the present disclosure, the metallic matrix is composed of an FeCr. It is in this way possible to produce, for example, an NbC—FeCr powder or $Cr_3C_2$—FeCr powder, where the NbC metal matrix powder or the $Cr_3C_2$ metal matrix powder will hereinafter be referred to as NbC—FeCr powder or as $Cr_3C_2$—FeCr powder, respectively, however the present disclosure is not restricted thereto. Here, the NbC—FeCr powder or $Cr_3C_2$—FeCr powder is produced so that a size of particles of the NbC—FeCr powder or $Cr_3C_2$—FeCr powder is in the range from 10 µm to 125 µm, or from 15 µm to 45 µm. The proportion of NbC in the NbC—FeCr powder or the proportion of $Cr_3C_2$ in the $Cr_3C_2$ FeCr powder is in the range from 50% by weight to 90% by weight, or from 75% by weight to 85% by weight in the case of NbC and from 70% by weight to 80% by weight in the case of $Cr_3C_2$.

In process step 102, a brake disk main element is produced from aluminum or an aluminum alloy. Various production methods may be employed. Apart from casting of aluminum alloys, in one form Al—Si-based alloys having a silicon content of from 7% by weight to 22%, by weight the brake disk main element can also be produced by forming or forging or powder metallurgically or by joining of components, for example by friction welding of rings composed of an aluminum alloy onto brake disk pots composed of the same or different materials.

In some variations of the present disclosure, the order of the process steps 101 and 102 may be reversed. Both the brake disk main element as substrate and the NbC—FeCr powder or the $Cr_3C_2$—FeCr powder and optionally further desired powders for setting a metallic matrix have to be provided at the same time for the laser powder build-up welding process.

In process step 103, a protective coating is produced on a brake side or on two brake sides of the brake disk main element, i.e. on the friction ring of the brake disk main element, using a laser powder build-up welding process. During the laser powder build-up welding process, the NbC—FeCr powder or the $Cr_3C_2$—FeCr powder and optionally further powders for setting a desired metallic matrix based on aluminum are supplied simultaneously to a surface region of the brake disk main element which has been melted by a laser. The further powder supplied is based on aluminum and in its total composition may have a proportion of silicon of from 12% by weight to 50% by weight and can be referred to as aluminum-silicon powder. In addition, proportions of copper, iron, chromium and/or nickel can be present, but the proportion of these is limited so that a total amount of not more than 15% by weight of these elements is present in the metallic matrix of the protective coating in order to inhibit embrittlement of the metallic matrix.

FIG. 2 shows a flow diagram for a further working example of a process according to another form of the present disclosure for producing a brake disk.

In process step 201, an NbC metal matrix powder or a $Cr_3C_2$ metal matrix powder is produced by agglomeration and sintering of NbC particles or $Cr_3C_2$ particles and particles of a metallic matrix composed of a stainless steel, i.e., for example, FeCr, so as to produce, for example, NbC—

FeCr powder or $Cr_3C_2$—FeCr powder. Here, the NbC metal matrix powder or $Cr_3C_2$ metal matrix powder is produced in such a way that a size of particles of the NbC metal matrix powder or $Cr_3C_2$ metal matrix powder is in the range from 10 μm to 125 μm, or in the range from 15 μm to 45 μm. A proportion of NbC in the NbC metal matrix powder or a proportion of $Cr_3C_2$ in the $Cr_3C_2$ metal matrix powder is in the range from 50% by weight to 90% by weight, or from 75% by weight to 85% by weight in the case of NbC and from 70% by weight to 80% by weight in the case of $Cr_3C_2$.

In process step 202, a brake disk main element is produced from a gray cast iron material. The production operation in process step 202 can comprise casting and cooling of the brake disk main element. In addition, the production operation in process step 202 can encompass machining in the form of turning the brake disk main element. Furthermore, the production operation in process step 202 encompasses roughening the brake side of the brake disk main element by water blasting.

In some variations, the order of process steps 201 and 202 may be reversed.

In process step 203, an aluminum alloy spray layer is applied, for example, by electric arc spraying to the roughened brake side of the brake disk main element. The aluminum alloy spray layer may be an Al—Mg spray layer.

In process step 204, the spray layer is sintered together with the brake disk main element at about 570° C. for about 30 minutes.

In process step 205, a protective coating is produced on a brake side or two brake sides using a laser powder build-up welding process. During the laser powder build-up welding process, the NbC metal matrix powder or $Cr_3C_2$ metal matrix powder and powder for the targeted setting of an aluminum alloy matrix are simultaneously supplied to a surface region of the protective layer which has been melted by a laser used for this purpose. The proportion of silicon in the aluminum alloy powder may be in the range from 12% by weight to 50% by weight. During the laser powder build-up welding process, the elements copper, iron, chromium and/or nickel can be supplied to the molten surface region of the protective layer in order to achieve an increase in strength of the metallic matrix by formation of fine precipitates of intermetallic phases with aluminum. In order to provide fine distribution of the precipitates and thus inhibit embrittlement of the metallic matrix, the total content of the elements copper, iron, chromium and/or nickel should be limited to not more than 15% by weight in the protective coating.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A process for producing a protective coating at least on a brake side of a brake disk main element, the process comprising:
   producing at least one of an NbC metal matrix powder and a $Cr_3C_2$ metal matrix powder by agglomeration and sintering at least one of NbC particles and $Cr_3C_2$ particles, respectively, with particles of a metallic matrix composed of a stainless steel; and
   producing a protective coating using a laser powder build-up welding process, wherein during the laser powder build-up welding process the at least one of the NbC metal matrix powder and the $Cr_3C_2$ metal matrix powder is supplied simultaneously with an aluminum alloy powder to a molten surface region of the brake disk main element melted by a laser.

2. The process according to claim 1, wherein the NbC metal matrix powder is NbC—FeCr powder and the $Cr_3C_2$ metal matrix powder is $Cr_2C_2$—FeCr powder.

3. The process according to claim 1, wherein the aluminum alloy powder is an aluminum-silicon alloy powder.

4. The process according to claim 1, wherein a proportion of silicon in the aluminum alloy powder is between 12% by weight and 50% by weight.

5. The process according to claim 1, wherein the NbC metal matrix powder and the $Cr_3C_2$ metal matrix powder have a particle size in a range from 10 μm to 125 μm.

6. The process according to claim 1, wherein the NbC metal matrix powder and the $Cr_3C_2$ metal matrix powder have a particle size in a range from 15 μm to 45 μm.

7. The process according to claim 1, wherein a proportion of NbC in the NbC metal matrix powder and a proportion of $Cr_3C_2$ in the $Cr_3C_2$ metal matrix powder is in the range from 50% by weight to 90% by weight.

8. The process according to claim 1, wherein a proportion of NbC in the NbC metal matrix powder is in a range of 75% by weight to 85% by weight and a proportion of $Cr_3C_2$ in the $Cr_3C_2$ metal matrix powder is in a range from 70% by weight to 80% by weight.

9. The process according to claim 1, wherein the laser powder build-up welding process is carried out using a multijet nozzle with at least four jets.

10. The process according to claim 1, wherein the laser powder build-up welding process is carried out using a multijet nozzle with six jets.

11. The process according to claim 1, wherein at least one of copper, iron, chromium and nickel are supplied simultaneously to the molten surface region of the brake disk main element during the laser powder build-up welding process.

12. The process according to claim 1, wherein the brake side of the brake disk main element is composed of a gray cast iron and an aluminum alloy spray layer is applied to the brake side of the brake disk main element before carrying out the laser powder build-up welding process.

13. The process according to claim 12, wherein the aluminum alloy spray layer is sintered together with the brake disk main element during the laser powder build-up welding process and the aluminum alloy spray layer is an Al—Mg spray layer.

14. A process for producing a brake disk with a brake disk main element composed of aluminum or an aluminum alloy, wherein a protective coating is produced at least on the brake side of the brake disk main element using the process according to claim 1.

15. A process for producing a brake disk with a brake disk main element made of gray cast iron material, wherein an aluminum alloy spray layer is applied to the brake side of the brake disk main element made of gray cast iron, the spray layer is sintered together with the brake disk main element and a protective coating is produced at least on the brake side using the process according to claim 1.

16. The process according to claim 15, wherein the aluminum alloy spray layer is an Al—Mg spray layer.

17. The process according to claim 15, wherein the brake side of the brake disk main element is roughened before application of the spray layer.

18. The process according to claim 15, wherein the brake side of the brake disk main element is subjected to a turning process before roughening.

19. A process for producing a protective coating at least on a brake side of a brake disk main element, the process comprising:
   producing at least one of an NbC—FeCr powder and a $Cr_3C_2$—FeCr powder by agglomeration and sintering of at least one of NbC particles and $Cr_3C_2$ particles, respectively, with particles of a metallic matrix composed of a stainless steel; and
   producing a protective coating using a laser powder build-up welding process, wherein during the laser powder build-up welding process the at least one of the NbC—FeCr powder and the $Cr_3C_2$—FeCr powder is supplied simultaneously with an aluminum alloy powder to a molten surface region of the brake disk main element melted by a laser.

20. The process according to claim 19, wherein at least one of copper, iron, chromium and nickel is supplied simultaneously to the molten surface region of the brake disk main element during the laser powder build-up welding process.

\* \* \* \* \*